United States Patent
Chu et al.

(10) Patent No.: US 6,534,153 B1
(45) Date of Patent: Mar. 18, 2003

(54) MATTE SURFACE FILM WITH IMPROVED MATTE APPEARANCE

(75) Inventors: Shaw-Chang Chu, Princton Junction, NJ (US); George F. Cretekos, Farmington, NY (US); John A. Larter, Canandaigua, NY (US); Tien-Kuei Su, Fairport, NY (US); John R. Wagner, Jr., Rochester, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/457,638

(22) Filed: Dec. 9, 1999

(51) Int. Cl.$^7$ ................................................ B32B 27/32
(52) U.S. Cl. ..................... 428/195; 428/447; 428/910; 428/516; 264/173.15; 264/173.19
(58) Field of Search .................. 428/516, 447, 428/910, 195; 264/173.15, 173.19, 177.17, 177.19

(56) References Cited

U.S. PATENT DOCUMENTS

| | | | |
|---|---|---|---|
| 4,824,912 A | 4/1989 | Su | 525/240 |
| 4,996,096 A | 2/1991 | Dew | 428/216 |
| 5,364,704 A | 11/1994 | Murschall et al. | 428/516 |
| 5,366,796 A | 11/1994 | Murschall et al. | 428/216 |
| 5,451,468 A | 9/1995 | Seiler et al. | 428/515 |
| 5,466,520 A | 11/1995 | Krallman et al. | 428/323 |
| 5,473,016 A | 12/1995 | Fujii et al. | 525/74 |
| 5,474,820 A | 12/1995 | Murschall et al. | 428/35.7 |
| 5,489,454 A | 2/1996 | Peiffer et al. | 428/34.9 |
| 5,492,757 A | 2/1996 | Schuhmann et al. | 428/329 |
| 5,494,717 A | 2/1996 | Peiffer et al. | 428/34.9 |
| 5,496,600 A | 3/1996 | Peiffer et al. | 428/35.7 |
| 5,501,905 A | 3/1996 | Krallmann et al. | 428/339 |
| 5,516,563 A | 5/1996 | Schumann et al. | 428/34.2 |
| 5,618,369 A | 4/1997 | Peiffer et al. | 156/233 |
| 5,886,123 A | 3/1999 | Resconi et al. | 526/348.6 |
| 6,086,982 A * | 7/2000 | Peifer et al. | 428/213 |

FOREIGN PATENT DOCUMENTS

| | | |
|---|---|---|
| EP | 0622185 A1 | 4/1994 |
| JP | 405329992 A * | 12/1993 |
| JP | 410292075 A * | 11/1998 |
| WO | 99/07553 | 2/1988 |

OTHER PUBLICATIONS

Chemistry, "Significant Figures", Raymond Chang, 3$^{rd}$ Ed., pp. 19–22, 1988.*
Patent Abstracts of Japan, vol. 15, No. 246 (E–1081), Jun. 24, 1991 & JP 03 077394 A (Oki Electric Ind. Co. Ltd.) Apr. 2, 1991, abstract.

* cited by examiner

*Primary Examiner*—D Lawrence Tarazano
(74) *Attorney, Agent, or Firm*—Rick F. James; Keith A. Bell

(57) ABSTRACT

The present invention relates to a matte surface film comprising: a base layer comprising a polyolefin; and a matte surface layer comprising a blend of high molecular weight high density polyethylene (HMWHD PE) with at least one incompatible polyolefin. The incompatible polyolefin may be ethylene propylene (EP) copolymers, ethylene butylene propylene (EBP) terpolymers or polypropylene (PP) homopolymers, such as metallocene catalyzed isotactic polypropylene (m-iPP) or metallocene catalyzed syndiotatic polypropylene (m-sPP). The matte surface layer may additionally contain a low molecular weight high density polyethylene or a medium molecular weight high density polyethylene. The film possesses an improved matte appearance and may be used for packaging and label applications.

13 Claims, No Drawings

MATTE SURFACE FILM WITH IMPROVED MATTE APPEARANCE

FIELD OF THE INVENTION

The present invention relates to a matte surface film. More particularly, the present invention relates to a multilayer polyolefin matte surface film having improved matte appearance.

BACKGROUND OF THE INVENTION

Matte surface films have a variety of useful purposes. Primarily, they form a good background for displaying printed or artful images on the film. The images can be printed onto the matte surface film by any conventional plastic printing process.

Mobil Chemical Company film product "70 MLT" is a matte surface biaxially oriented multilayer film. The base layer is oriented polypropylene and the matte surface skin layer comprises a mixture of polyethylenes and an ethylene-propylene-butene-1 terpolymer. The matte surface film has a dull surface appearance; that is, it is not shiny or glossy. Such a surface appearance is not typical of most biaxially oriented films used in packaging but is advantageous in that it provides an unusual appearance when reverse printed on the side opposite to the matte surface.

While the above-described matte surface film is excellent in many respects, it would be desirable to produce a matte surface film that has an improved matte appearance.

U.S. Pat. No. 5,492,757 to Schuhmann, et al. discloses an opaque, matte, multilayer polypropylene film having at least one base layer and at least one interlayer, and an outer layer applied to this interlayer. The base layer includes polypropylene and fillers. The interlayer includes a mixture or blend of two components I and II, wherein component I is a propylene homopolymer or a copolymer of α-olefins having 2 to 10 carbon atoms, or a terpolymer of α-olefins having 2 to 10 carbon atoms, or a mixture or blend of these polymers and component II is a high density polyethylene (HDPE) or a blend of HDPE and a propylene homopolymer or copolymer of a copolymer of α-olefins having 2 to 10 carbon atoms, or a terpolymer of α-olefins having 2 to 10 carbon atoms, or a mixture or blend of these polymers. The outer layer essentially includes a copolymer of α-olefins having 2 to 10 carbon atoms, or a terpolymer of α-olefins having 2 to 10 carbon atoms, or a mixture or blend of these polymers.

U.S. Pat. No. 5,494,717 to Peiffer, et al. discloses a heat-sealable, shrinkable multilayer film which comprises at least one base layer containing a propylene polymer or a propylene polymer mixture and at least one outer layer which comprises a mixture or blend of two components I and II, wherein the mixture contains copolymers or terpolymers of α-olefins having 2 to 10 carbon atoms and HDPE.

U.S. Pat. No. 5,496,600 to Peiffer, et al. discloses a multilayer polypropylene film which contains at least one base layer containing polypropylene or a polypropylene mixture and resin, and at least one outer layer which contains a mixture or blend of two components I and II.

U.S. Pat. No. 5,516,563 to Schumann, et al. discloses an opaque, matte, multilayer polypropylene film including at least one base layer comprising polypropylene or a polypropylene mixture and fillers, and at least one outer layer which contains a mixture or blend of two components I and II.

Similarly, U.S. Pat. No. 5,618,369 to Peiffer, et al. discloses a matte multilayer polypropylene film which includes at least one base layer containing polypropylene and migrating additives or a mixture of migrating additives, and at least one outer layer which includes a mixture or blend of two components I and II.

There remains a need in the art for new and improved methods for making matte films with new and improved properties.

SUMMARY OF THE INVENTION

The present invention is directed to a matte surface film comprising:
(a) a base layer comprising a polyolefin; and
(b) a matte surface layer comprising a blend of high molecular weight high density polyethylene (HMWHD PE) with at least one incompatible polyolefin.

The incompatible polyolefin in the matte surface layer may be selected from ethylene propylene (EP) copolymers, ethylene butylene propylene (EBP) terpolymers, and polypropylene.(PP) homopolymers, such as metallocene catalyzed isotactic polypropylene (m-iPP) and metallocene catalyzed syndiotatic polypropylene (m-sPP).

The matte surface layer may further comprise a low molecular weight high density polyethylene or medium molecular weight high density polyethylene.

The matte surface layer of the present invention may have an improved matte appearance. In particular, the surface texture of the matte surface layer may be nodular.

The present matte surface film is heat sealable and has improved processability in comparison with other types of matte films.

DETAILED DESCRIPTION OF THE INVENTION

The matte surface film of the present invention has a base layer comprising polyolefin and a matte surface layer comprising a blend of high molecular weight high density polyethylene with at least one incompatible polyolefin.

The base layer may comprise polypropylene or high density polyethylene (HDPE). Particularly useful HDPE polymers for producing the base layer include, but are not limited to, HDPE M6211 and HDPE M6030 sold by Lyondell Chemical Company, HD-6704.67 sold by Exxon Chemical Company, and the like.

The matte surface film may be an oriented polypropylene (OPP) film, and is preferably biaxially oriented.

The matte surface layer is formed by providing a blend of at least one incompatible polyolefin with high molecular weight high density polyethylene (HMWHD PE). Examples of suitable incompatible polyolefins include ethylene propylene copolymer (EP), ethylene butylene propylene terpolymer (EBP) or a polypropylene (PP) homopolymer, such as a metallocene catalyzed isotactic polypropylene (m-iPP) or metallocene catalyzed syndiotatic polypropylene (m-sPP).

High molecular weight high density polyethylene (HMWHD PE) polymers have a melt index of less than 1 and preferably less than 0.5. The HMWHD PE may have a density of about 0.940 to about 0.980 g/cm$^3$, and a melting point of about 115 to about 140° C. For example, the HMWHD PE may have a density of about 0.95 to about 0.970 g/cm$^3$, and a melting point of about 120 to about 134° C. Melt index may be measured in accordance with ASTM D1238 under a load of 2.16 kg at 190° C.

A matte surface may contain very small (e.g., microscopic) raised areas in the form of fibers (e.g., elongated ridges) and/or in the form of nodules (e.g., essentially spherically shaped mounds). Those surfaces which include primarily fibers may be described as fibrillar, whereas those including primarily nodules may be described as nodular.

When the incompatible polyolefin is a metallocene catalyzed polypropylene resin, the matte surface texture may be controlled. That is, when standard polypropylene is changed to metallocene catalyzed polypropylene, the surface texture :changes from a fibrillar nature to a nodular nature. This surface morphological change results in a dramatic improvement in the matte appearance of the film.

When the incompatible polyolefin is EP or EBP or m-sPP, the matte surface texture obtained with the blend of EP with HMWHD PE, EBP with HMWHD PE, and m-sPP with HMWHD PE, is nodular in nature and is also heat sealable. Gloss can be controlled by the ratio of sealable resin to HMWHD PE.

The matte surface layer may be a terblend system, for example, comprising a blend of high molecular weight high density polyethylene, either a low molecular weight high density polyethylene (LMWHD PE) or a medium molecular weight high density polyethylene (MMWHD PE), and at least one incompatible polyolefin. The incompatible polyolefin may be EP copolymer, EBP terpolymer or PP homopolymer. The blend of this embodiment provides films with an improved matte appearance, while mitigating lenses (clear spots resulting from unmelted high molecular weight species) and alleviating die buildup problems.

The copolymer of ethylene and propylene and the terpolymer of ethylene, propylene and butylene may be comprised predominantly of propylene. Such copolymer or terpolymer, may contain more than about 80% propylene. The ethylene polymer may include a copolymer or a blend of different kinds of ethylene polymers. For example, the ethylene polymer may be a blend of two or more ethylene polymers each having different densities. In one embodiment that is contemplated, the ethylene polymer comprises at least a first ethylene polymer having a density of at least about 0.91 g/cm$^3$ and a second ethylene polymer having a density which is different from the density of the first ethylene polymer. For example, the blend may comprise high density polyethylene and low density polyethylene or linear low density polyethylene. The ratio of the blend components will vary depending upon the polyethylene components of the blend and the desired characteristics of the surface layer. A blend in which an equal proportion of each component is employed, such as a 50:50 blend, may be used. However, other blends may be used, such as a blend of 50% ethylene-propylene-butene-1 terpolymer, 40% high density polyethylene (0.95 g/cm$^3$), and 10% of a lower density polyethylene (approx. 0.92 g/cm$^3$).

Commercially available polymer products which may be used to form the matte surface layer include the following: EP 8573, which is an ethylene-propylene copolymer, sold by Fina Oil and Chemical Company; Chisso 7800, which is an ethylene-butylene-propylene terpolymer, sold by Chisso Corporation; Fina EOD 97-09, which is a metallocene-catalyzed isotactic polypropylene (m-iPP), sold by Fina oil and Chemical Company; Fina EOD 98-03, which is metallocene-catalyzed syndiotactic polypropylene (m-sPP), sold by Fina Oil and Chemical Company; Equistar M6211, which is a (low/medium) molecular weight high density polyethylene resin from Equistar Corporation; Mobil HXZ 801 HDPE resin from Mobil Oil Corporation; and Equistar L5005 HDPE resin from Equistar Company.

Metallocene catalyzed isotactic polypropylenes have relatively narrow composition distributions and relatively narrow molecular distributions. These metallocene catalyzed isotactic polypropylenes may have an isotacity of 85% or greater (as measured by solubility in xylene).

Metallocene catalyzed syndiotactic polypropylene may possess a syndiotacticity of at least 70% based on racemic pentads, typically greater than 75%, as measured by C$^{13}$ NMR spectroscopy. The mean length of sequence n$_r$ of the syndiotactic sequences is preferably greater than about 20, more preferably greater than about 25.

The metallocene catalyzed syndiotactic polypropylene may have a melt flow of about 3 and 7 g/10 min, for example, from 4–5 g/10 minutes, as measured in accordance with the standard ASTM D1238 method.

On a side of the base layer opposite to the side on which the matte surface layer is situated, there may be a film-forming polymer having properties appropriate for extrusion and uniaxial or biaxial orientation (by stretching the extrudate in the machine direction and/or transverse direction under elevated temperatures) and for forming a skin layer. Such a layer may comprise a thermoplastic polymer, which may be composed predominantly of an olefinic polymer such as propylene homopolymer, ethylene homopolymer, propylene or ethylene copolymer, or terpolymer of propylene, ethylene and butylene. This thermoplastic polymer layer may be the same or different from the layer which provides the matte surface. When it is desirable for this layer to be printable, sealable, or treatable for printing or sealing, this layer may be comprised of, for example, an ethylene homopolymer having a density of about 0.91 to about 0.96 g/cm$^3$, ethylene-propylene copolymer in which the ethylene content is about 2 to 10% by weight based upon the total weight of the copolymer or an ethylene-propylene-butene-1 terpolymer in which the ethylene content is about 0.5 to about 7 weight % ethylene and about 5 to about 30 weight % butylene, each based upon the total weight of the terpolymer.

Additives may be used to enhance film properties or provide the film with certain properties. Such additives are used in effective amounts, which vary depending upon the property required, and may be selected from the group consisting of: antistatic agents, antiblock agents, slip additives, antioxidant additives, moisture barrier additives or gas barrier additives. These additives may be included in the base layer, the matte surface layer, or any other layer.

Useful antistatic additives may be that can be used in amounts ranging from about 0.05 to about 3 weight %, based upon the weight of the layer, including alkali metal sulfonates, polyether-modified polydiorganosiloxanes, polyalkylphenylsiloxanes and tertiary amines.

Antiblock additives may be used in amounts ranging from about 0.1 weight % to about 3 weight % based upon the entire weight of the layer. These antiblock additives may include inorganic particulates such as silicon dioxide, e.g. a particulate antiblock sold by W. R. Grace under the trademark "SIPERNAT 44," calcium carbonate, magnesium silicate, aluminum silicate, calcium phosphate, and the like, e.g., KAOPOLITE. Another useful particulate antiblock agent is referred to as a non-meltable crosslinked silicone resin powder sold under the trademark "TOSPEARL" made by Toshiba Silicone Co., Ltd. and is described in U.S. Pat. No. 4,769,418. Another useful antiblock additive is a spherical particle made from methyl methacrylate resin having an average diameter of 1 to 15 microns. Such an additive is sold under the trademark "EPOSTAR" and is commercially available from Nippon Shokubai.

Slip additives may include higher aliphatic acid amides, higher aliphatic acid esters, waxes and metal soaps. These slip additives may be used in amounts ranging from about 0.1 to about 2 weight percent based on the total weight of the layer. A specific example of a fatty amide slip additive is erucamide.

A conventional silicone oil additive having a viscosity of 10,000–60,000 cSt. may also be used.

Antioxidants may be used in amounts ranging from about 0.1 weight % to about 2 weight percent, based on the total weight of the layer, phenolic antioxidants. A particular antioxidant is commercially available under the trademark "Irganox 1010".

Barrier additives may be used in useful amounts and may include low-molecular weight resins, hydrocarbon resins, particularly petroleum resins, styrene resins, cyclopentadiene resins and terpene resins.

Optionally, the outer layers may be compounded with a wax for lubricity. Amounts of wax range from about 2 to about 15 weight % based on the total weight of the layer. Any conventional wax useful in thermoplastic films is contemplated.

The process of making the matte surface layer can be by masterbatch in which the matte surface thermoplastic polymer blend, along with any optional additives is prepared and mixed (usually by dry mixing) into the matte surface forming thermoplastic polymer blend. The mixture may then be melt mixed in an extruder or compounded in a twin screw extruder. Alternatively, the matte surface layer may be prepared in one step by mixing the thermoplastic polymer blend and, optionally, any additives in the proportions used for making up the final matte surface layer composition.

The matte surface film may be formed by coextruding the HDPE base layer together with the matte surface layer and any additional layer through a flat sheet extruder die at a temperature ranging from between about 200 to about 270° C., casting the film onto a cooling drum and quenching the film. The sheet may then be stretched about 4 to about 8 times in the machine direction (MD) orienter followed by stretching about 6 to about 10 times in the transverse direction (TD) orienter. The film may then be wound onto a reel. Optionally, one or both of the external surfaces may be coated and/or flame treated or corona treated before winding.

The film of the present invention may comprise two or three layers: the base layer; the matte surface layer (usually the outermost skin layer); and optionally another layer (also usually the outermost skin layer) which is on the other side of the base layer opposite to the matte surface layer. Additional layers can be incorporated between the core layer and the outermost skin layers, e.g., tie layers comprising various polymers (e.g., polypropylene or polyethylene). The base layer may represent about 70 to about 97 percent of the thickness of the total film. The skin layers may be coextensively applied to each major surface of the base layer, for example, typically by coextrusion, as noted above. The skin layers may not, ultimately, be the outermost layers of a final film product, which includes the matte surface film.

The film may be used as a packaging film or as a printed film. The film may be printed by any conventional means, and contemplated printing means include letterpress, offset, silk screen, electrostatic and photographic methods. Specific printing methods include thermal dye transfer (including dye sublimation), lithographic printing, flexographic printing, gravure printing, hot stamping, valley printing, roll-leaf printing and spanishing. Polyolefins may be treated before printing in order to make them receptive to inks. Treating methods include casing, electronic treating and flame treating.

EXAMPLES

In each of the following Examples, various properties, including the haze and gloss of the film are determined. The haze (%) is measured in accordance with ASTM D1003, and the gloss (at a 45° angle) is measured in accordance with ASTM D2457.

In the Examples which follow, three-layered films were coextruded through a flat sheet extruder die at a temperature of about 230° C., cast onto a cooling drum maintained at 40° C., and then quenched at 40° C. The sheet was then stretched about 5 times in the machine direction (MD) orienter at 105° C. and then about 8 times in the transverse direction (TD) orienter at 160° C. to produce about a 1 mil thick film.

Example 1

A three-layer oriented film comprising two polypropylene layers B, and a matte surface layer A in an ABB configuration was produced. The polypropylene layers B were made of PP 3371, which is a polypropylene having a melt flow rate of 2.8 g/10 minutes, sold by Fina Oil and Chemical Company.

The two component system for forming matte surface layer A was a pellet blend mixed in a standard single screw extrusion system available on a pilot line. EP to HMWHD PE ratios were examined from 70/30 to 30/70 weight percent. The blended resins were used as a skin in a ABB coextruded structure at 7 gauge unit thickness in the final 1 mil oriented polypropylene (OPP) film.

The matte surface layer comprises a blend of Equistar L5005 HMWHD PE resin from Equistar Company having a melt index of about 0.055 g/10 minutes, and a density of about 0.949 g/cm$^3$, with EP 8573, which is an ethylene propylene copolymer, sold by Fina Oil and Chemical Company.

Properties of the film are reported in Table 1.

Example 2

Example 1 was repeated, except a different resin blend was used to form the matte surface layer A. The matte surface layer comprises a blend of Equistar L5005 HMWHD PE resin from Equistar Company with Chisso 7800, which is an ethylene butylene propylene terpolymer, sold by Chisso Corporation.

Properties of the film are shown in Table 1.

Example 3

Example 1 was repeated, except a different resin blend was used to form the matte surface layer A. The matte surface layer comprises a blend of Equistar L5005 HMWHD PE resin from Equistar Company with Fina EOD 98-03, which is a metallocene catalyzed syndiotatic polypropylene (m-sPP), sold by Fina Oil and Chemical Company.

Properties of the film are reported in Table 1.

Example 4

Example 1 was repeated., except a different resin blend was used to form the matte surface layer A. The matte surface layer comprises a blend of Equistar L5005 HMWHD PE resin from Equistar Company with Fina 3371, which is a standard isotactic polypropylene (iPP), sold by Fina Oil and Chemical Company.

Properties of the film are reported in Table 1.

Example 5

Example 1 was repeated, except a different resin blend was used to form the matte surface layer A. The matte surface layer comprises a blend of Equistar L5005 HMWHD PE resin from Equistar Company with Fina EOD 97-09, which is a metallocene catalyzed isotactic polypropylene (m-iPP), sold by Fina Oil and Chemical Company.

Properties of the film are reported in Table 1.

concentrations above 50%, a lower gloss and a rougher surface was obtained. Additionally, the EP copolymer and the EBP terpolymer systems were heat sealable as measured by Crimp seals at 240° F. and 280° F. The metallocene catalyzed syndiotatic PP resin (Example 3) also produced a matte surface layer having a low gloss surface and being heat sealable. For the Standard iPP resin (Example 4) there was no effective heat sealability and for the metallocene catalyzed iPP resin (Example 5) some sealability was exhibited at 280° F. Being sealable only at a high temperature means that the film is not considered to be sealable.

Example 6

A three-layer oriented film comprising two polypropylene layers B, and a matte surface layer A in an ABB configuration was produced. The polyporpylene layers B were made of PP 3371, which is a polypropylene having a melt flow rate of 2.8 g/10 minutes, sold by Fina Oil and Chemical Company.

The two component system for forming matte surface layer A was mixed in a twin screw extrusion system into 40% PP–60% HMWHD PE compounds. The resins were used as a skin in an ABB coextruded structure with the compound resin as a 7 gauge unit thickness in the final 1 mil oriented polypropylene (OPP) film.

The matte surface layer comprises a blend of Mobil HXZ 801 HMWHD PE resin from Mobil Oil Corporation having a density of.about 0.960 g/cm$^3$, with Fina EOD 9709, which is a metallocene catalyzed polypropylene having a melt flow rate of 4–5 g/10 minutes, sold by Fina Oil and Chemical Company.

Results are shown in Table 2.

Example 7

Example 6 was repeated, except a different resin blend was used to form the matte surface layer A. The matte surface layer comprises a blend of Equistar L5005 HMWHD PE resin from Equistar Corporation with Fina EOD 97-09, which is a metallocene catalyzed polypropylene having a melt flow rate of 4–5 g/10 minutes, sold by Fina Oil and Chemical Company.

TABLE 1

| Roll | 5005 % | % | Crimp 240F | Crimp 280F | Haze % | Gloss % | TMI sr ($\mu$) | Ra ($\mu$in.) | Rt ($\mu$in.) | R3z ($\mu$in.) | Pc1 Peaks/ inch | Pc1 peaks/ inch |
|---|---|---|---|---|---|---|---|---|---|---|---|---|
| Example 1 | 70 | 30 | 350 | 865 | 49.9 | 21.2 | 2.08 | 20.8 | 282 | 77.2 | 329 | 319 |
|  | 70 | 30 | 355 | 620 | 32.9 | 37.9 | 2.05 | 20.5 | 258 | 64.2 | 237 | 226 |
|  | 50 | 50 | 335 | 605 | 81.4 | 5.9 | 1.99 | 20.7 | 182 | 75.1 | 442 | 430 |
|  | 30 | 70 | 305 | 595 | 86.7 | 5.2 | 2.19 | 23.1 | 218 | 82.8 | 421 | 413 |
| Example 2 | 70 | 30 | 435 | 690 | 53.3 | 18.8 | 1.95 | 24.5 | 238 | 73.6 | 267 | 259 |
|  | 50 | 50 | 505 | 600 | 84.1 | 5.3 | 1.81 | 22.4 | 258 | 80.2 | 383 | 375 |
|  | 30 | 70 | 400 | 575 | 87.4 | 5.0 | 2.21 | 25.1 | 226 | 86.2 | 390 | 382 |
| Example 3 | 40 | 60 | 380 | 620 | 84.4 | 5.3 | 1.63 |  |  |  |  |  |
| Example 4 | 50 | 50 | 25 | 210 | 26.9 | 31.1 | 0.98 | 11.5 | 128 | 38.8 | 216 | 202 |
| Example 5 | 70 | 30 | 10 | 590 | 66.6 | 9.9 | 1.95 | 18.8 | 186 | 73.6 | 451 | 445 |
|  | 50 | 50 | 15 | 605 | 80.8 | 5.5 | 2.15 | 27.4 | 265 | 93.1 | 413 | 405 |
|  | 30 | 70 | 10 | 600 | 82.0 | 5.3 | 2.19 | 27.7 | 217 | 99.3 | 404 | 401 |

As seen from Table 1, when EP (Example 1) and EBP (Example 2) resins were blended with HMWHD PE at Results are shown in Table 2.

Example 8

Example 6 was repeated, except a different resin blend was used to form the matte surface layer A. The matte surface layer comprises a blend of Mobil HXZ 801 HMWHD PE resin from Mobil Oil Corporation with Fina 3371, which is a standard polypropylene having a melt flow rate of 2.8 g/10 minutes, sold by Fina Oil and Chemical Company.

Properties of the film are reported in Table 2.

Example 9

Example 6 was repeated, except a different resin blend was used to form the matte surface layer A. The matte surface layer comprises a blend of Equistar L5005 HMWHD PE resin from Equistar Corporation with Fina 3371, which is a standard polypropylene having a melt flow rate of 2.8 g/10 minutes, sold by Fina Oil and Chemical Company.

Properties are listed in Table 2.

TABLE 2

| Roll | MDX | Haze % | Gloss MD | Ra | Rt | Roughness R3z | Pc.1 | Pc1 |
|---|---|---|---|---|---|---|---|---|
| Ex. 6 | 40/60 | 5.0 | 82.4 | 5.2 | 15.0 | 134 | 56.6 | 543 | 533 |
| Ex. 6a | | 5.5 | 80.8 | 5.2 | 15.9 | 176 | 57.9 | 528 | 519 |
| Ex. 7 | 40/60 | 5.0 | 76.4 | 5.9 | 15.2 | 132 | 57.3 | 505 | 492 |
| Ex. 7a | | 5.5 | 74.3 | 6.2 | 14.8 | 141 | 52.5 | 464 | 447 |
| Ex. 8 | 40/60 | 5.0 | 30.0 | 24.1 | 10.1 | 150 | 32.8 | 240 | 225 |
| Ex. 8a | | 5.5 | 33.6 | 23.8 | 6.4 | 85 | 24.6 | 303 | 289 |
| Ex. 9 | 40/60 | 5.0 | 24.9 | 29.4 | 7.5 | 70 | 25.7 | 255 | 232 |
| Ex. 9a | | 5.5 | 27.0 | 28.0 | 8.6 | 93 | 28.7 | 267 | 250 |

As seen from Table 2, when metallocene catalyzed polypropylene was blended with either of two HMWHD PEs (Examples 6, 6a, 7 and 7a), a lower gloss and a rougher surface was obtained than when a standard polypropylene was blended with the same HMWHD PEs (Examples 8, 8a, 9 and 9a). A reason for this improvement in gloss is the change in skin surface morphology from a fibrillar structure to a nodular structure.

Example 10

A three-layer oriented film comprising two polypropylene layers B, and a matte surface layer A in an ABB configuration was produced in the same manner as Example 1. The polypropylene layers B were made of PP 3371, which is a polypropylene having a melt flow rate of 2.8 g/10 minutes, sold by Fina Oil and Chemical Company. The polypropylene skin layer included Sylobloc 44, which is a synthetic silica antiblock agent manufactured and marketed by W. R. Grace Davison Division.

A three-component terblend system was used to form matte outer layer A. The terblend system comprised one high molecular weight high density polyethylene (HMWHD PE), one low molecular weight or medium molecular weight high density polyethylene (LMWHD PE or MMWHD PE), and one ethylene butylene propylene (EBP) terpolymer.

The three-component system was mixed in a twin-screw Brabender extruder equipped with a 1/12 inch capillary die at 230° C. and 20 rpm (shear rate of 80 sec$^{-1}$); die build-up was rated from 1 (least) to 10 (most). The trial was conducted using a flat die with the width of 12" and gap of 55 mils at ouput rate of 400 lbs/hr.

The matte surface layer comprises a blend of 40 parts Equistar L5005 HMWHD PE resin from Equistar Corporation with 20 parts Chisso 7880, which is an ethylene-butylene-propylene terpolymer and 40 parts Equistar M6211, which is a (low/medium) molecular weight high density polyethylene resin from Equistar Corporation.

The die build-up data are tabulated in Table 3. In terms of film appearance, the effect of blend components/compositions on matte appearance (surface gloss) and lenses are shown in Table 4.

Example 11

Example 10 was repeated, except the relative amounts of Chisso 7880, Equistar L5005 and Equistar M6211 in the blend were changed. The matte surface layer in Example 11 comprised a blend of 60 parts Equistar L5005 HMWHD PE resin with 20 parts Chisso 7880, and 20 parts Equistar M6211.

The die build-up data are tabulated in Table 3. In terms of film appearance, the effect of blend components/compositions on matte appearance (surface gloss) and lenses are shown in Table 4.

Example 12

Example 10 was repeated, except the relative amounts of Chisso 7880, Equistar L5005 and Equistar M6211 in the blend were changed. The matte surface layer in Example 8 comprised a blend of 15 parts Equistar L5005 HMWHD PE resin with 40 parts Chisso 7880, and 45 parts Equistar M6211.

The die build-up data are tabulated in Table 3. In terms of film appearance, the effect of blend components/compositions on matte appearance (surface gloss) and lenses are shown in Table 4.

Example 13

Example 10 was repeated, except the relative amounts of Chisso 7880, Equistar L5005 and Equistar M6211 in the blend were changed. The matte surface layer in Example 9 comprised a blend of 45 parts Equistar L5005 HMWHD PE resin with 40 parts .Chisso 7880, and 15 parts Equistar M6211.

The die build-up data are:,tabulated in Table 3. In terms of film appearance, the effect of blend components/compositions on matte appearance (surface gloss) and lenses are shown in Table 4.

Example 14

Example 10 was repeated, except the relative amounts of Chisso 7880, Equistar L5005 and Equistar M6211 in the blend were changed. The matte surface layer in Example 10 comprised a blend of 30 parts Equistar L5005 HMWHD PE resin with 40 parts Chisso 7880, and 30 parts Equistar M6211.

The die build-up data are tabulated in Table 3. In terms of film appearance, the effect of blend components/compositions on matte appearance (surface gloss) and lenses are shown in Table 4.

Comparative Example 1

Example 10 was repeated, except the resin of the matte surface layer A was a blend of 50% by weight of a HDPE with about 50% by weight of a conventional ethylene-propylene-butene-1 terpolymer. Specifically, the HDPE had a melting point of about 132 to about 134° C., a melt index of about 0.1 to 0.2 g/10 minutes, and a density of about 0.955 g/cm$^3$. The ethylene-propylene-butene-1 terpolymer mainly comprised propylene units with about 10% by weight or less of ethylene and 10% by weight or less of butene-1, and had a melting point of about 122 to about 126° C.

The die build-up data are tabulated in Table 3. In terms of film appearance, the effect of blend components/compositions on matte appearance (surface gloss) and lenses are shown in Table 4.

Example 15

Example 10 was repeated, except the resin was a binary resin in which the matte surface layer comprised a blend of 60 parts Equistar L5005 HMWHD PE resin with 40 parts: Chisso 7880, and no Equistar M6211.

The die build-up data are tabulated in Table 3. In terms of film appearance, the effect of blend components/compositions on matte appearance (surface gloss) and lenses are shown in Table 4.

TABLE 4

| Compositions, % | | | Gloss, % | # of |
|---|---|---|---|---|
| Chisso 7880 | Equistar L5005 | Equistar M6211 | at 45° | Lenses* |
| 20 | 40 | 40 | 7.6 | 3 |
| 20 | 60 | 20 | 5.3 | 2 |
| 40 | 15 | 45 | 10.0 | 1 |
| 40 | 45 | 15 | 5.6 | 4 |
| 40 | 30 | 30 | 7.0 | 3 |
| 60 | 20 | 20 | 10.3 | 3 |
| 60 | 30 | 10 | 7.6 | 3 |
| 25 | 75 | 0 | 9.8 | 7 |
| 50 | 50 | 0 | 9.8 | 17 |
| 60 | 40 | 0 | 9.8 | 11 |

*Number of lenses per 140 in$^2$

The results show that matte appearance of both binary and ternary blends with lower surface gloss are better than the resin of the Comparative Example (surface gloss of 10.7%). Compared to the binary blend, the terblend provides better appearance and contains much fewer lenses (<5/140 in $^2$).

To further illustrate the concept of the ternary blend, Table 5 summarizes other terblends with different third components.

TABLE 3

| | | Compositions | | | Die Build-Up$^{(1)}$, min | | | | Die Build-Up$^{(2)}$ |
|---|---|---|---|---|---|---|---|---|---|
| | Resin | Chisso 7880 | Equistar L5005 | Equistar M6211 | 1 | 3 | 10 | 30 | after 3 hours |
| Example 10 | Ternary | 20 | 40 | 40 | 2 | 2 | 2 | 2 | No |
| Example 11 | Ternary | 20 | 60 | 20 | 1 | 2 | 3 | 4 | No |
| Example 12 | Ternary | 40 | 15 | 45 | 1 | 2 | 3 | 4 | |
| Example 13 | Ternary | 40 | 45 | 15 | 2 | 3 | 4 | 9 | |
| Example 14 | Ternary | 40 | 30 | 30 | 2 | 2 | 2 | 7 | |
| Comp. Ex. 1 | Ternary | | | | 4 | 7 | 9 | 10 | Yes |
| Example 15 | Binary | 40 | 60 | | 7 | 8 | 10 | 10 | |

$^{(1)}$the experiment was conducted using a twin-screw Brabender extruder equipped with a 1/12 inch capillary die at 230° C. and 20 rpm (the shear rate was 80 sec$^{-1}$); die build-up was rated from 1 (least) to 10 (most).
$^{(2)}$the trial was conducted using a flat die with the width of 12" and gap of 55 mils at ouput rate of 400 lbs/hr.

As shown in Table 3, the laboratory data using a capillary die clearly illustrate that the ternary blend has a lower tendency of die build-up than the binary blend or the resin of Comparative Example 1. In other words, adding the third component, Equistar M6211 reduces die build-up markedly. The results shown in Table 3 confirm the observation in the laboratory. That is, a large amount of die build-up was observed across the die lip for the resin of the Comparative Example after 3 hours of extrusion. In contrast, there is no noticeable die build-up for the terblends, Examples 10 and 11.

TABLE 5

| | Composition, % | | | | | |
|---|---|---|---|---|---|---|
| Sample # | Chisso 7880 | Equistar L5005 | Equistar 6030A | Equistar 6060 | Gloss, % at 45° | # of Lenses* |
| 1 | 20 | 40 | 40 | | 13.5 | 2 |
| 2 | 20 | 60 | 20 | | 5.7 | 1 |

TABLE 5-continued

| Sample # | Composition, % | | | | Gloss, % at 45° | # of Lenses* |
| --- | --- | --- | --- | --- | --- | --- |
| | Chisso 7880 | Equistar L5005 | Equistar 6030A | Equistar 6060 | | |
| 3 | 20 | 40 | | 40 | 14.5 | 2 |
| 4 | 20 | 60 | | 20 | 6.3 | 1 |

*Number of lenses per 140 in$^2$

Table 5 confirms that terblends can provide films with low surface gloss and a minimum amount of lenses.

What is claimed is:

1. A matte surface film comprising:
   (a) a base layer comprising a polyolefin; and
   (b) a matte surface layer comprising a blend of high molecular weight high density polyethylene (HMWHD PE) with at least one incompatible polyolefin, wherein said incompatible polyolefin is selected from the group consisting of ethylene propylene (EP) copolymers, ethylene butylene propylene (EBP) terpolymers and polypropylene (PP) homopolymers, and wherein said matte surface layer further comprises low molecular weight high density polyethylene (LMWHD PE) or medium molecular weight high density polyethylene (MMWHD PE).

2. A matte surface film according to claim 1, wherein said incompatible polyolefin is a polypropylene (PP) homopolymer selected from the group consisting of metallocene-catalyzed isotactic polypropylene and metallocene-catalyzed syndiotactic polypropylene.

3. A matte surface film according to claim 2, wherein said metallocene catalyzed polypropylene is a syndiotactic polypropylene having a melt flow rate of 4–5 g/10 minutes.

4. A matte surface film according to claim 2, wherein said base layer comprises polypropylene or high density polyethylene (HDPE).

5. A matte surface film according to claim 2, which is biaxially oriented.

6. The matte surface film as claimed in claim 2, wherein at least one layer of said matte surface film further comprises an additive selected from the group consisting of antistatic agents, antiblock agents, slip additives, silicone oil having a viscosity of 10,000–60,000 centistokes, antioxidants, barrier additives, and wax.

7. A packaging film or a printed film comprising the matte surface film as defined in claim 2.

8. A matte surface film according to claim 1, said base layer comprises polypropylene or high density polyethylene (HDPE).

9. A matte surface film according to claim 1, which is biaxially oriented.

10. The matte surface film as claimed in claim 1, wherein at least one layer of said matte surface film further comprises an additive selected from the group consisting of antistatic agents, antiblock agents, slip additives, silicone oil having a viscosity of 10,000–60,000 centistokes, antioxidants, barrier additives, and wax.

11. A packaging film or a printed film comprising the matte surface film as defined in claim 1.

12. The matte surface film as claimed in claim 2, wherein said high molecular weight high density polyethylene (HMWHD PE) has a melt index of less than 0.5 g/10 minutes.

13. A process for producing a matte surface film, comprising:
   coextruding a polypropylene or high density polyethylene (HDPE) base layer together with a matte surface layer comprising a blend of high molecular weight high density polyethylene with at least one incompatible polyolefin through a flat sheet extruder die at a temperature ranging from between about 200 to about 270° C.;
   casting the film onto a cooling drum;
   quenching the film; and
   stretching the film in at least one direction, wherein said incompatible polyolefin is selected from the group consisting of ethylene propylene (EP) copolymers, ethylene butylene propylene (EBP) terpolymers and polypropylene (PP) homopolymers, and wherein said matte surface layer further comprises low molecular weight high density polyethylene (LMWHD PE) or medium molecular weight high density polyethylene (MMWHD PE).

* * * * *